United States Patent
Vegesna-Venkata et al.

(10) Patent No.: US 10,951,681 B2
(45) Date of Patent: Mar. 16, 2021

(54) EDITING AN UNHOSTED THIRD PARTY APPLICATION

(71) Applicant: Zoho Corporation Private Limited, Kanchipuram District (IN)

(72) Inventors: RamaKrishna Raja Vegesna-Venkata, San Jose, CA (US); SakthiaMuthu D. Ranjithkumar, Chennai (IN); Raj P. Sabhlok, Pleasanton, CA (US); Sridhar Vembu, Pleasanton, CA (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 15/903,746

(22) Filed: Feb. 23, 2018

(65) Prior Publication Data

US 2018/0183854 A1    Jun. 28, 2018

Related U.S. Application Data

(62) Division of application No. 13/312,883, filed on Dec. 6, 2011, now Pat. No. 9,930,092.

(60) Provisional application No. 61/420,207, filed on Dec. 6, 2010.

(51) Int. Cl.
 *H04L 29/08* (2006.01)
 *G06F 40/166* (2020.01)

(52) U.S. Cl.
 CPC ............ *H04L 67/02* (2013.01); *G06F 40/166* (2020.01); *H04L 67/143* (2013.01); *H04L 67/146* (2013.01); *H04L 67/20* (2013.01)

(58) Field of Classification Search
 CPC ....... H04L 67/02; H04L 67/20; H04L 67/025; H04L 67/34; H04L 67/143; H04L 67/146; H04L 12/2818; H04L 12/2825; H04L 41/0246; H04L 2029/06054; H04L 29/06; H04L 65/403; H04L 67/1002; H04L 67/1008; H04L 67/1095; H04L 67/26; H04L 67/2819; G06F 17/30905; G06F 17/30663; G06F 40/166; G06Q 10/107; G06Q 20/085; G06Q 20/10; G06Q 30/0283; G06Q 40/00
 USPC .......................................................... 709/203
 See application file for complete search history.

(56) References Cited

U.S. PATENT DOCUMENTS

| | | | |
|---|---|---|---|
| 6,832,380 B1 | 12/2004 | Lau | |
| 6,950,987 B1* | 9/2005 | Hargraves | G06F 16/93 715/207 |
| 7,424,543 B2 | 9/2008 | Rice, III | |
| 8,266,242 B2* | 9/2012 | Foulger | G06F 16/954 709/217 |
| 8,352,680 B2* | 1/2013 | O'Connell, Jr. | H04L 67/1095 711/118 |
| 8,484,292 B2 | 7/2013 | Spataro | |
| 8,555,176 B2 | 10/2013 | Elumalai | |

(Continued)

*Primary Examiner* — Aaron N Strange
(74) *Attorney, Agent, or Firm* — Ahmann Kloke LLP

(57) ABSTRACT

A document editing system using a third party application having an embedded document editing module is disclosed. The system include a client-side document editing engine that accepts requests to edit a document from and displays at least a portion of the document to a user of the client-side system. The system includes a first server-side application engine that processes the requests to edit the document. The system can include a second server-side data storage engine that stores the document in a remote storage location.

20 Claims, 6 Drawing Sheets

(56) References Cited

U.S. PATENT DOCUMENTS

| | | | |
|---|---|---|---|
| 8,621,391 B2 | 12/2013 | Leffert | |
| 8,694,925 B1* | 4/2014 | Beust | G06F 40/134 |
| | | | 715/866 |
| 8,856,210 B2* | 10/2014 | O'Connell, Jr. | G06F 12/0802 |
| | | | 709/203 |
| 9,647,872 B2* | 5/2017 | Appelman | H04L 29/08684 |
| 2001/0034771 A1* | 10/2001 | Hutsch | G06F 9/541 |
| | | | 709/217 |
| 2002/0116716 A1* | 8/2002 | Sideman | G06F 16/40 |
| | | | 725/91 |
| 2002/0188435 A1* | 12/2002 | Labarge | G06F 40/58 |
| | | | 704/1 |
| 2003/0088831 A1* | 5/2003 | Bauer | G06F 17/30011 |
| | | | 715/809 |
| 2005/0192966 A1* | 9/2005 | Hilbert | G06F 17/30067 |
| 2006/0036568 A1 | 2/2006 | Moore | |
| 2006/0129627 A1* | 6/2006 | Phillips | H04L 63/10 |
| | | | 709/200 |
| 2007/0033588 A1* | 2/2007 | Landsman | H04L 67/02 |
| | | | 717/178 |
| 2007/0168514 A1 | 7/2007 | Cocotis | |
| 2007/0183741 A1* | 8/2007 | Lerman | H04N 21/6125 |
| | | | 386/249 |
| 2007/0220014 A1* | 9/2007 | Emling | G06F 17/30126 |
| 2007/0220417 A1* | 9/2007 | Mathew | G06F 16/958 |
| | | | 715/234 |
| 2009/0125518 A1* | 5/2009 | Bailor | H04L 65/4015 |
| 2009/0254572 A1* | 10/2009 | Redlich | G06Q 10/06 |
| 2010/0011282 A1* | 1/2010 | Dollard | G06F 17/241 |
| | | | 715/233 |
| 2010/0192072 A1 | 7/2010 | Spataro | |
| 2011/0252312 A1* | 10/2011 | Lemonik | G06F 17/248 |
| | | | 715/255 |
| 2011/0252339 A1* | 10/2011 | Lemonik | G06F 17/2288 |
| | | | 715/753 |
| 2013/0218845 A1* | 8/2013 | Kleppner | G06F 17/30165 |
| | | | 707/687 |
| 2015/0309978 A1* | 10/2015 | Howell | G06F 17/241 |
| | | | 715/230 |

* cited by examiner

EDITING AN UNHOSTED THIRD PARTY APPLICATION

CROSS-REFERENCE TO RELATED APPLICATIONS

This application is a divisional of U.S. patent application Ser. No. 13/312,883, filed Dec. 6, 2011, which claims priority to U.S. Provisional Patent Application No. 61/420,207 filed Dec. 6, 2010, both of which are incorporated by reference herein.

BACKGROUND

Applications that edit user generated (or automatically generated) data normally reside on a user's personal computer, or workstation. The application allows the computer user the flexibility to perform local changes and save the result in some format locally. The resulting saved file can be viewed in editable format, enabling one to use input devices such as a keyboard or mouse, to make changes, and save in a native format. The user can invoke the same application to view the file in the native format. Files saved in a native format can be shared between users who use the same application. An example of such a widely used system, is the Microsoft suite of applications (Microsoft Word, Excel, etc.). One evolution of this application takes advantage of networked computers and allows the creator of a file to share the document with another user through a file transfer system such as via email attachment or file sharing on networked computers, enabling the other user to make further changes, thus allowing for collaboration on the same document. The document can be transferred between multiple users.

Another evolution of the document editing application takes advantage of the cloud computing paradigm that eliminates the need (for the user) to own and maintain application software. Instead, users can use an application hosted on a remote server, and host their data on a remote data storage system, managed by the hosting server based on input by the user. This system makes it possible for users to access remote applications using the Internet, and browsers, while the application logic itself, is maintained and upgraded by a central entity, the entity that hosts the application and is responsible for storage of user data and application logic source. One outcome of this is the ability to improve features involving collaboration.

The foregoing examples of the related art and limitations related therewith are intended to be illustrative and not exclusive. Other limitations of the related art will become apparent upon a reading of the specification and a study of the drawings.

SUMMARY

Using techniques described in this paper, one or more of the above-described problems have been reduced or eliminated, while other techniques may be directed to other improvements. The following examples and aspects thereof are described and illustrated in conjunction with systems, tools, and methods that are meant to be exemplary and illustrative, not necessarily limiting in scope.

One example of a problem that emerges from the state of the art is that users of third party applications or systems (that is, systems made by other entities or vendors) cannot use the document editing application from within another application (or system) that could generate data that a user might want to edit or modify using the remote editing application. An example is a book publishing system developed by a third party that might incorporate the document editing features served by the remote application server. Another example is an Internet-enabled device that provides a document editing application in the system for its users. In that case the device operating system itself might want to provide access to the editing services hosted on a remote server. A further example could be a data analysis package that would generate data that could be viewed and edited in a remote spreadsheet application. Another example is a hosted system, such as Yahoo, which hosts its own application that users access through the browser. The user might want to access a document managed by Yahoo, the third party, and open and edit it. The service of editing is hosted by a different remote server, and Yahoo, itself does not provide the same service. As is described in greater detail in this paper, users of third party applications or systems are given the ability to use a document editing application from within another application.

Another example of a problem that exists in hosted applications is that a data file is saved and managed by the remote system implementing the application logic. This may be beneficial to some users, since it allows for backup and maintenance of user information on a possible reliable shared storage in a secure center. In other cases, users may not be interested in having their documents located remotely in a system that they do not manage. As is described in greater detail in this paper, a system provides the benefits of using document files that the user manages using his own repository and at the same time provides the benefits of using centrally managed applications, and multi-user collaboration.

DETAILED DESCRIPTION

Figure 1:
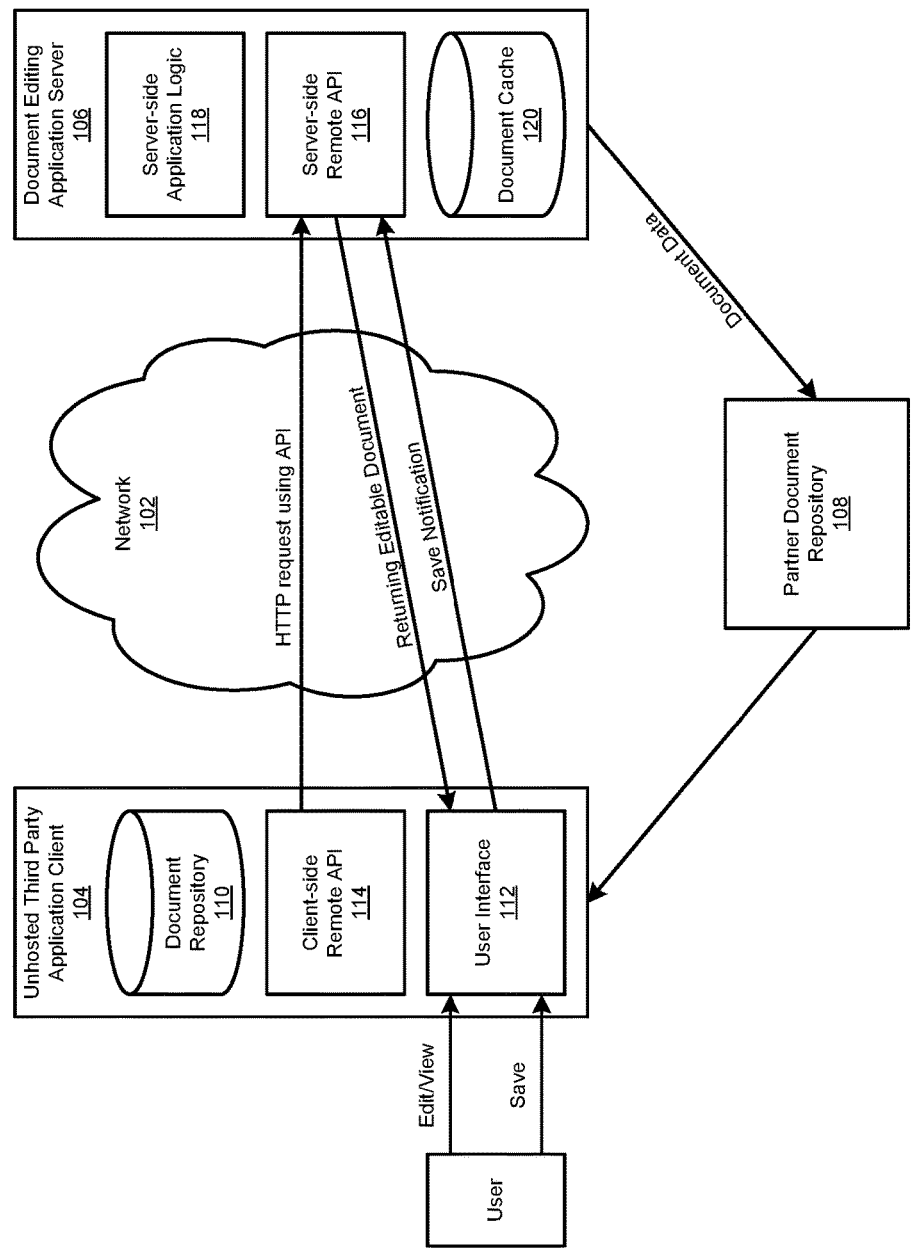
FIG. 1 depicts an example of a system for document editing.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Lexicography

An "application server" generally describes a set of software components executing on hardware in a system, that is accessible through an application programming interface (API). In the case of a web application server, the system includes a web server hosted on the system. This server supports the construction of (potentially) dynamic web pages on a client browser, and the deployment of a software service, on demand, over the internet. The application server is the entity that performs the application logic in the "software as a service" or SaaS model. SaaS is a model that is currently used to deploy software services for customer relationship management, document management, billing, invoicing, financials, and so on.

A "third party application" generally describes a software application developed and distributed or sold by an entity or vendor different from the entity that develops the web application service, in this description. In the state of the art, it is customary to find applications composed of several components developed by different entities, working together through established interfaces. That makes it possible to reduce duplication and cost, and helps benefit from the re-use of built and tested components. This paper includes a description of a novel technique of embedding a document editing component within a third party application that includes document editing as a part of its functionality, and connects to an application server over, e.g., the Internet. This third party application could be constructed through different architectural configurations. It could itself be accessed from a browser connecting to a server run by the third party, or it could be a monolithic application on a device, or an operating system itself. In cases that are of interest in this paper, it is capable of connecting to the Internet to access the remote server that hosts the editing application.

An "embedded component" generally describes a part of the editing application that is integrated into another software system, developed by a third party. The embedded part and the remaining functionality implemented at a remote server, together perform the application logic for the software service, such as document editing. The server part could be programmed to receive inputs from several such embedded components from various third party applications. The embedded component is coupled tightly to the third party application, so that users see an integrated user interface, such as the integration of document editing within a larger document management system. An example is a Filesystem Explorer on a desktop or web application, which also provides the functionality of file editing or viewing. The editing or viewing functionality is provided by the remote server application, but it appears seamlessly integrated within the Filesystem Explorer to the user of the third-party application.

FIG. 1 depicts an example of a system 100 for document editing. The system 100 includes a network 102, an unhosted third party application client 104, a document editing application server 106, and a partner document repository 108. In the example of FIG. 1, the system 100 includes some examples of data that flows between components of the system. A user can provide inputs to the system though a user interface, such as a browser, that is integrated into the unhosted third party application 104. The unhosted third party application client 104, document editing application server 106, and partner document repository 108 are coupled to the network 102.

In the example of FIG. 1, the network 102 can include a networked system that includes several computer systems coupled together, such as a local area network (LAN), the Internet, or some other networked system. The term "Internet" as used in this paper refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. Applicable known or convenient physical connections of the Internet and the protocols and communication procedures of the Internet and the web are and/or can be used. The network 102 can broadly include, as understood from relevant context, anything from a minimalist coupling of the components illustrated in the example of FIG. 1, to every component of the Internet and networks coupled to the Internet. However, components that are outside of the control of the system 100 can be considered sources of data received in an applicable known or convenient manner.

Networks can include enterprise private networks and virtual private networks (collectively, private networks), which are well known to those of skill in computer networks. As the name suggests, private networks are under the control of an entity rather than being open to the public. Private networks include a head office and optional regional offices (collectively, offices). Many offices enable remote users to connect to the private network offices via some other network, such as the Internet. As used in this paper, a private network can refer to a network that is under the control of an entity, such as a business enterprise. Home or office area networks are also typically implemented as private networks.

A computer system will usually include a processor, memory, non-volatile storage, and an interface. Peripheral devices can also be considered part of the computer system. A typical computer system will include at least a processor, memory, and a device (e.g., a bus) coupling the memory to the processor. The processor can include, for example, a general-purpose central processing unit (CPU), such as a microprocessor, or a special-purpose processor, such as a microcontroller. The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not be possible to store the entire program in memory. Nevertheless, it should be understood that for software to run, if necessary, it is moved to a computer-readable location appropriate for processing, and for illustrative simplicity, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to one or more interfaces. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs to configure the general purpose systems in a specific manner in accordance with the teachings herein as specifically purposed computer systems, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to the example of FIG. 1, the unhosted third party application client 104 includes a document repository 110, a user interface 112, and a client-side remote API 114. The third party application client is "unhosted" because, in a specific implementation, the unhosted third party application 104 is not hosted as a service by the document editing application server 106. In a specific implementation, the unhosted third party application 104 is be developed by an entity different from the entity that hosts the document editing application server 106.

In various embodiments, the unhosted third party application client 104 may or may not be architecturally diverse. For example, the unhosted third party application client 104 could be implemented as a monolithic operating system of a device, which has files that are editable. As another example, the unhosted third party application client 104 could be implemented as a hosted system, such as an online file storage application, or an online email system. In this case, a remote server can be associated with the unhosted third-party application client 104. It may be noted that the third party application can be hosted by a third party controlled remote server, but that the unhosted third party application client 104 is still unhosted, in this example, relative to the document editing application server 106. Where it is not clear from context, the unhosted third party application client 104 can be referred to as a "document editing application server unhosted third party application client" to clarify that "unhosted" is in reference to the fact that the document editing application server does not host the third party application. In this paper, the third party controlled remote server is rarely referenced, and the unhosted third party application client 104 can be characterized as, e.g., generating requests for editing to the document editing application server 106 that performs the logic for editing the unhosted third party application document without any ambiguity.

The document repository 110 is a datastore. While the document repository 110 is illustrated as on the unhosted third party application client 104, the unhosted third party application client 104 can be architecturally diverse, and the document repository 110 need not be on the same network as the unhosted third party application client 104 (or managed by the same entity). As used in this paper, a datastore can be implemented, for example, as software embodied in a physical computer-readable medium on a general- or specific-purpose machine, in firmware, in hardware, in a combination thereof, or in an applicable known or convenient device or system. Datastores in this paper are intended to include any applicable organization of data, including tables, comma-separated values (CSV) files, traditional databases (e.g., SQL), structured storage (e.g., NoSQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The user interface 112 can be implemented in a number of ways, including as a browser, through which a user can provide input and, in a typical implementation, receive output. For illustrative purposes, a user is depicted as providing an edit/view command and a save command, though any number of different commands could be received from the user at the user interface 112. The user interface 112 can also include multiple different interfaces.

The client-side remote API 114 constructs an API call that is used in a manner that is described with reference to the document editing application server 106.

The document editing application server 106 includes a server-side remote API 116, server-side application logic 118, and a document cache 120. The client-side remote API 114 at the unhosted third party application client 104 location works with the server-side remote API 116 at the document editing application server 106 location to give the third party application access to the remote application server. In some instances, the client-side remote API 114 uses input from a user received through the user interface 112 to construct an API call that is used by the server-side remote API 116. In at least this way, the unhosted third party application client 104 can forward a user's requests to the document editing application server 106.

Requests received at the server-side remote API 116 are processed in accordance with the request and the server-side application logic 118, while the data itself is hosted in the document repository 110 and made available to the remote application server. Results from processing by the server-side application logic 118 can include, for example, editable files, status information, etc. The results are returned to the user interface 112 (and more specifically, if applicable, a document interface of the user interface 112). Presumably, the user has access to the user interface 112 and can continue providing input to be processed by the server-side application logic 118, or can issue a command to save.

Saving is handled by an API call from the client-side remote API 114 to the server-side remote API 116, but the data itself is saved at the document repository 110. In a specific implementation, the document editing application server has no data repository to store data files that belong to the unhosted third-party application. However, it is probably desirable to use temporary data during the process of editing, which can be saved in the document cache 120. The document cache 120 can be cleared at the end of a document editing process.

A collaborative save could also enable saving of document data at the partner document repository 108 or temporary maintenance at the document cache 120. In a specific implementation, the document editing application server 106 provides document data to the partner document repository 108 to facilitate collaborative saves.

Figure 2:
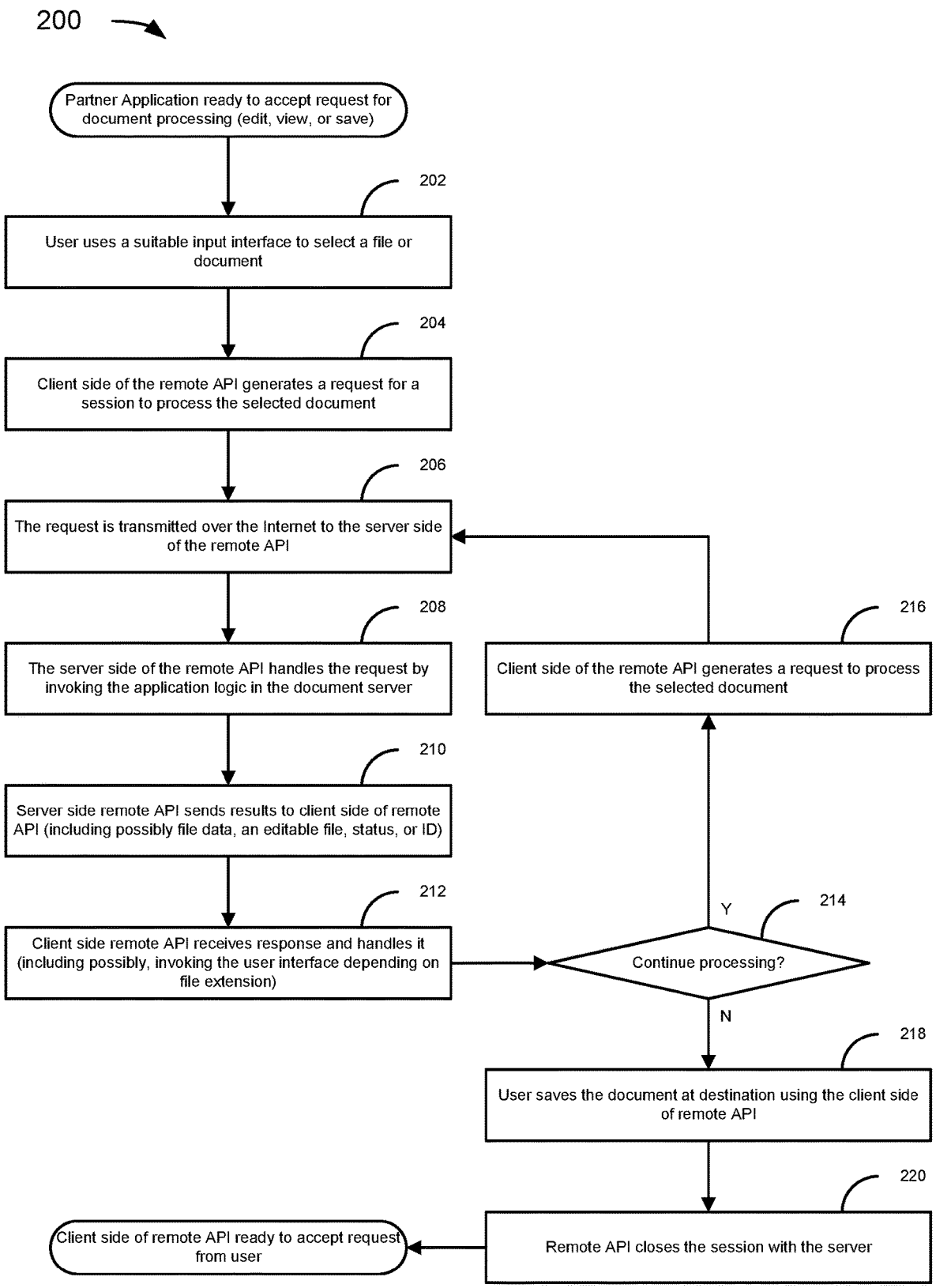
FIG. 2 depicts a flowchart of an example of a method of using a remote API embedded in a third party application to access services at a remote server.

FIG. 2 depicts a flowchart 200 of an example of a method of using a remote API embedded in a third party application to access services at a remote server. The flowchart 200 is organized as a sequence of modules. However, it should be understood that these, and modules associated with other methods described herein, may be reordered into different sequences of modules or for parallel execution. The flowchart 200 starts with a third-party application ready to accept user input.

In the example of FIG. 2, in block 202 where a user uses a suitable input interface to select the file or document. For example, a user could use a document management interface to select a listed document.

In the example of FIG. 2, in block 204, the client (or third-party or third party application) side of the remote API generates a request for a session to process the selected document. Optionally other parameters such as the client machine name, user name, a serial number, a random number or other parameters can be sent to help disambiguate requests.

In the example of FIG. 2, in block 206, the request is transmitted over, for example, Internet protocols http or https, to the server side of the remote API.

In the example of FIG. 2, in block 208, the server side of the remote API processes the request by invoking the application logic in the server. The initial request includes a request for a session, which can entail taking known or convenient actions to establish a session, such as opening a socket. Subsequent requests (see, e.g., decision point 214, below) may or may not necessitate session-establishment actions. The application logic can produce results, such as an editable file or status info.

In the example of FIG. 2, in block 210, the server side of the remote API sends the results of the processing back to the client side of the Remote API, through the Internet protocol. This transmission can include data, the editable file itself, or status.

In the example of FIG. 2, in block 212, the client side remote API receives and handles the response to the server, by invoking the user's interface, depending on the type of file, as indicated by the file extension.

In the example of FIG. 2, at decision point 214, it is determined whether the user using the third-party application wishes to continue or terminate. If it is determined that the user wishes to continue (214—Y), then the flowchart 200 continues to block 216 where the client side of the remote API generates a request to process the selected document, returns to block 206, and continues as described previously. If, on the other hand, it is determined that the user does not wish to continue (214—N), then the flowchart 200 continues to block 218 where the user initiates saving of the file, in the destination in the third-party file repository. As a result of these steps of the processing the saved file may or may not be in the same format as the original file that was opened for processing.

In the example of FIG. 2, in block 220, the remote API closes the session with the server. For illustrative purposes, when the flowchart 200 ends, the client-side remote API awaits further inputs from the user.

In a specific implementation, a user has access to a third party application. This is an application that uses document editing as one of its features, but the application itself is developed by an entity that is separate from the entity developing the web application providing the service of hosting the document editing application. The third-party application accesses the remotely hosted application logic using a Remote API. A component of the Remote API, the Client Side Remote API, is integrated into the third party application, while the Server Side of Remote API exists on the remote server, along with the application server hosted with a web server, thus enabling this communication between remote systems to happen through a protocol such as http (HyperText Protocol).

The following describes one method by which the third-party application can utilize the remote service through a Remote API. The method is as follows:

A user sits in front of a web browser, potentially in the process of using the third-party application. (In this example, the user interface is a web browser, it could be any alternative interface that can connect to the Internet). In the process, the user wishes to open and edit a file. In this example, the user accesses the functionality of a remote document editing application hosted at a remote server. The client side remote API implementation, integrated with the third-party application, makes file data available to the application server, along with possibly information about the destination location of the file. The server side remote API processes the input by using the application server to handle the request to edit data, and returns an editable version of the file data. The user continues this process until he is ready to save the file. At this time, the data is sent back to the server for transformation to requested format (if different from the original file format). The transformed file is returned to the third-party application. The client side remote API is responsible for interpreting the file name from the extension, and saving the contents of the file in a location accessible to the third-party application. The user closes the document, and the session with the server is terminated. At this point the server erases the data from its memory and no trace of the user data is left on the server. This may also happen periodically, that is, files may be marked for deletion and erased at pre-determined intervals.

The process and method of system installation in this example is as follows. The application server, which implements the logic (for document editing, in this case), is implemented at a web server site with all the other functionality to implement a reliable web server, with necessary reliability, security and backup. A component of the server functionality is the server side remote API that serves to receive requests from the client side remote API. The client side API, and other components dealing with user interface, is integrated into the third-party application, to make it capable of interacting with the web application. The documents themselves would be stored and accessed in a repository managed by the third-party application.

The main calls of the remote API are the open and save calls with special parameters used to handle the complexity of collaborative editing. Editing calls are specific to the application logic at the server, and are communicated from client to server without the intervention of the third party application. A client side implementation of these calls is embedded with the third party application, and a server side implementation enables the integration of the server side application logic to the third-party application over the Internet protocol.

Another variation of this configuration is the integration of local third party data with data that is edited using the server-side application. An example would be a spreadsheet application where some parts of the spreadsheet are being edited using the remote application, while other parts are generated by a local third-party application. In order to accomplish this, some of the editing commands might include parameters to facilitate data formatting, as an example, to enable seamless integration of data on the user screen.

The Open call consists of the following typically mandatory parameter-value pairs, in addition to other optional calls that are needed to impart the needed flexibility. This command is passed in a multi-part or normal HTTP POST Request.

Api-key, string (to uniquely identify the third party application in which the client side remote API is embedded)

output, string (determines the format of the output, default value is "url")

mode, string (determines whether it is normal view, edit, single user, or multi-user mode)

filename, string (filename with proper extension. The list of extensions permitted is specified)

id, string (unique handle returned by the server after saving in third-party repository)

format, string (determines the format for saving of file in the third-party document repository)

saveurl, string (the publicly accessible service that fetches the document from the document server to the destination repository)

Additional parameters might be used for uploading initial content (if file is not new) or a URL may be provided for a publicly accessible service to fetch the document content.

The method of opening a file may be implemented as follows: First the user accesses the third-party web portal with the client side remote API integrated in it, and opens the document. This initiates a request to the server system. The request is sent as a multi-part FORM or HTTP POST command from the third-party's application to the remote application server. The application returns the URL of the document to the third-party application. The document is then sent to the third-party application user's browser, which then uploads the content in the editor which is a component of the document editing application supported by the remote application server (such as text editor, spreadsheet, or word processor).

The Save Call: The document Save command is initiated by the user of the third-party application. The request goes to the remote application server for handling. In one embodiment, the server uses the SaveUrl value to locate a public service to transfer the document to the SaveUrl location. The client side remote API is responsible to return any status of completion of transfer to the server, and initiate transfer of contents to the document repository.

Figure 3:
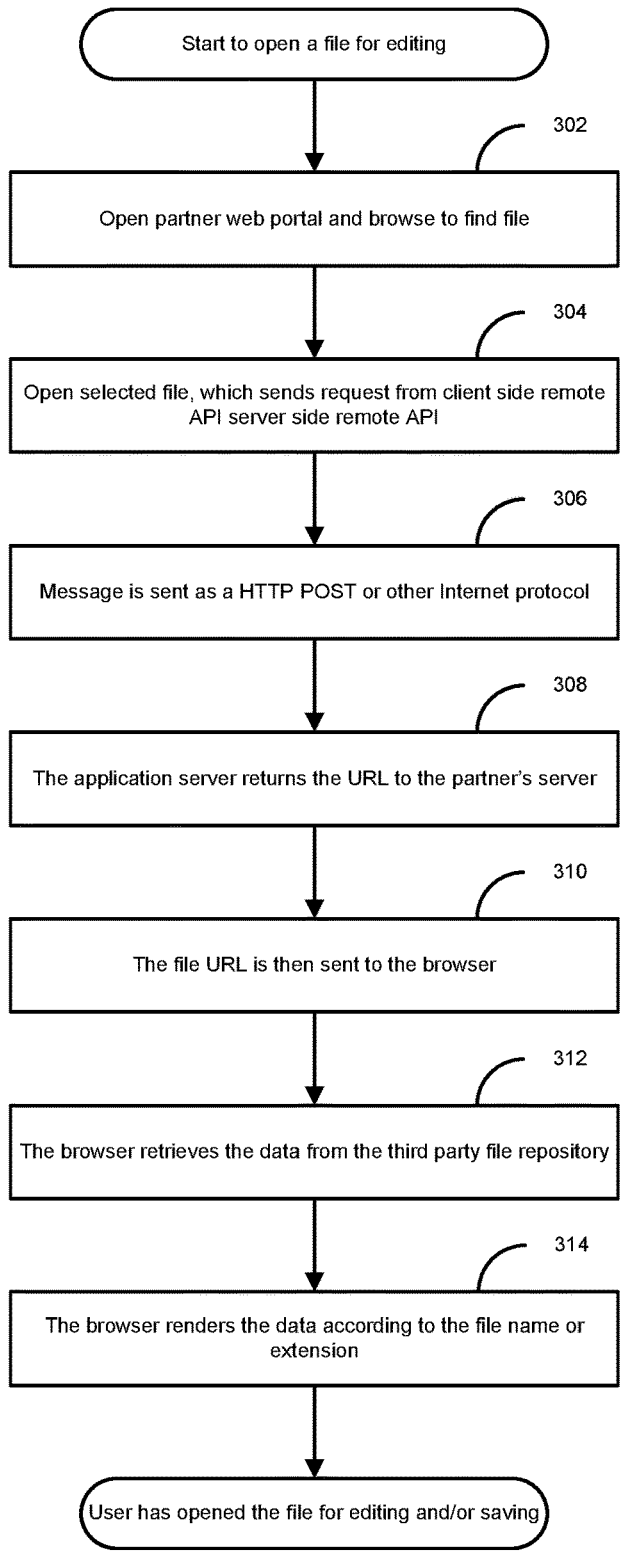
FIG. 3 depicts a flowchart of an example of a detailed operation of an open API call.
Figure 4:
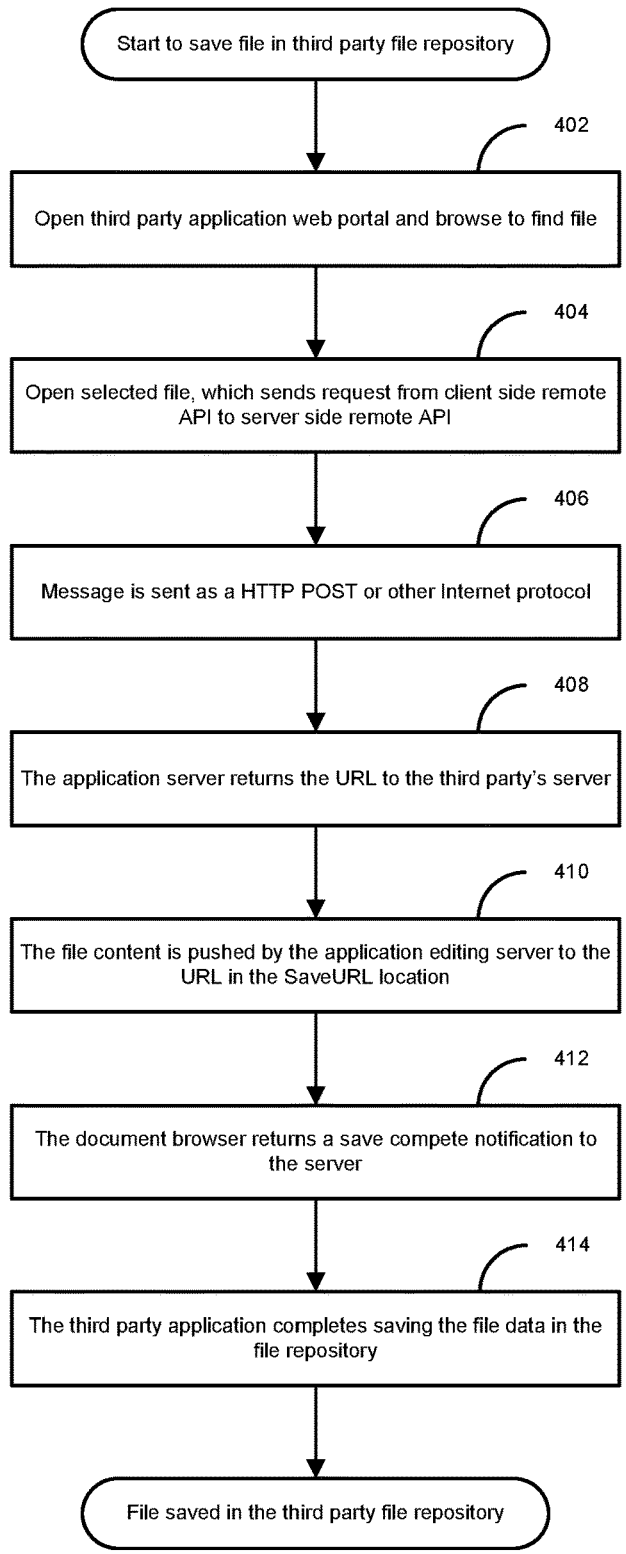
FIG. 4 depicts a flowchart of an example of a detailed operation of a save API call.

An alternative embodiment of this save process would be the case where the third party application user would like to access the services from the remote application service, from behind a firewall. In this case the third-party implements a remote agent that keeps a persistent connection to the remote application server through the Internet, and performs the task of file opening, transferring data and closing. This is used in the case where there is a firewall in place, and the persistent connection from within the firewall, accomplishes the data transfer. FIGS. 3 and 4 describe the flow for the open API call and the save API call.

FIG. 3 depicts a flowchart 300 of an example of a detailed operation of the open API call. In the example of FIG. 3, the open API call is described in the case where a user tries to open a file for editing, by accessing a web portal of a third party application. In this case, the third party application is itself a web application, hence consists of a web server and a web portal. The flowchart 300 starts with, the user starting to open a file for editing. In block 302, the user selects the file using a web portal accessing the partner application. In block 304, the request to open is sent from the client side API, whose implementation is integrated as a module into the third party application. The request is sent through the Internet, in block 306, to the module that implements the server side API, which is integrated with the remote server that implements the logic to edit documents. The application server returns the URL to the third party application server (since in this case the third party application itself is a server-client configuration), in block 308. The file URL is then sent to the browser in block 310. In block 312, the browser retrieves the file data from the third party application's file repository, which is managed by the third party application. In block 314, the browser renders the data for viewing and/or editing, according to the format specified in the file name extension. When the flowchart 300 ends the user has opened the file for viewing, and/or editing.

FIG. 4 depicts a flowchart 400 of an example of a detailed operation of a save API call. The flowchart 400 starts with the user starts to save a file in a file repository controlled by the third party application. In block 402, the user opens a web portal to the third party application, to browse and find the file. In this case, again, the third party is a web application, including a web server, and a portal to access the third party application. In block 404, a request is sent from the Client Side Remote API implementation at the third party application, to the Server Side Remote API, implemented at the remote server, coupled with the application logic for document editing. The message is sent as a HTTP POST or other Internet protocol command, in block 406. In block 408, the application server returns the URL to the third party application's server. In block 410, the file data is pushed by the document editing server to the location specified in the SaveURL parameter in the Save API call. The third party application returns a notification of completion of saving to the document server, in block 412. The document is saved in the file repository managed by the third party application, in block 414. When the flowchart 400 ends, the file save action has been completed.

In another embodiment, the third party application could be a monolithic application, or even a file system of an operating system. In that case, the steps would be substantially the same, except that the third party system does not have the components of a server and client, but would instead be a monolithic system.

Operation and Description—Additional Embodiment with Login ID

An additional embodiment is the use of the system using a login that the user has created with the remote application server, which processes and enforces userid's and passwords. In that case the session is assigned to that particular user and the user information is used to disambiguate requests and data from various sessions. In the case where the user has no user login information with the server, the opening of the file includes a step of generating a unique (random or otherwise made unique) session id to disambiguate the requests from a user.

Operation and Description—Additional Embodiment with Collaborative Editing

In another embodiment, more than one user may choose to open the same document, for the purpose of collaborating. In that case, every user is assigned a unique session id to manage the communication of the remote application server with each user. Each of the users' inputs is displayed on the screen for every other user so they may see the inputs of all the collaborators at all times. Some displays choose to color code each user's edits differently in order to make it easy to see the results of collaborative edits. When any user chooses to save the file, the file is saved at the destination accessible to the third-party system. After every user of the same file has closed the session with the server, the server deletes all the data and the third-party application has the data stored in a repository accessible to itself. Another aspect of flexibility allowed by such a system is that the user could choose to save the document in a different format than what he chose to edit. For example, a plain text document can be saved as a PDF. The conversion is done by the server, which integrates the capacity to perform any typical format conversion that may be required by the user.

Another embodiment differs in the handling of saving in the case of collaborative editing, where individual user requests to save are handled as "marked for saving", which is handled by the remote server logic. At the end the final "Save" transfers the data to a destination accessible to the third party system.

A server that supports collaboration in such a manner also has the ability to maintain usage statistics for each collaborating user. For example, it could maintain usage times, durations, and other statistics that could be used for billing individual users for usage.

Auto save functionality: At pre-determined intervals, the save call is invoked for the open document being saved. Once again in this case, there are two possibilities. In one scenario, every Save is sent to the third party application and in turn to the file repository. In another scenario, the application server handles temporary "save" commands, with a final commit to save, which is sent to the third party application and then to the file repository.

In yet another embodiment the user may have an account in both the third-party system and the server system. In that case, the user would log into the third-party system and then use the client side remote API to log into the server system, prior to invoking any functionality on the server to perform document editing or conversion.

Other embodiments might include the use of mobile devices running third party applications, which can now access the functionality of document editing, by connecting to the remote application server through the remote API. The document or source data files could be locally available on the mobile device or available on any network accessible from the mobile device.

Another embodiment is the system deployed in proximity to the third party site, where the application is not hosted on the public Internet. This might be desirable, for example, where the third party does not desire the application server to be remotely located, for security or reliability considerations.

Other embodiments include the third-party application choosing parameters related to internationalization, language, or other custom parameters in the process of opening, accessing or saving the documents, using the same remote API calls. In one example, the parameter might influence the fonts, display mode or other features of the editor. Other examples of parameters influencing the user interface, such as color themes, language, customization of logo and other aspects of user interface. These examples serve to illustrate that the parameters of the API can be made flexible to accomplish tight integration with the third-party application from a user interface perspective. In other words, the user can perceive and interact with the third party application as if it were one integrated interface, while it effectively incorporates one or more components that actually communicate with a remote application server, where the application logic is embedded.

A method of using a web application hosted on a remote server, from a third party application, using an embedded component of the remote application within the third party application, to edit or otherwise modify a data file. Opening the file and starting a session with the remote application, using the embedded component, from the third party application. Obtaining an editable version of the data file from the remote server. Sending the command inputs from input devices back to the server. Performing logic on the server, and returning the status or data to the third party application. Performing a "file save" operation on the third party application specifying the format of the resulting file, to the server. Performing application logic on the remote server to perform requested formatting. Using the embedded component to save the document in the specified format and closing the session with the remote server.

A system constructed in accordance with disclosed techniques can include a computer system configured using a third-party's application coupled to a remote communications software module, and a file storage repository. The system can, for example, in operation, accept requests from a user to process a document; transfer the requests to the remote communications software module; establish a session, through the remote communications software module, through a network such as the Internet, to an application server at a remote location; transfer the requests to the remote application server. In this way, the user can communicate with the remote server to edit the document, save the file data in the file storage repository controlled by the third-party's application, and close the established session.

The system can include additional functionality such as the remote server accepts the requests at the remote application server, configured with a server-side remote communications software module; the remote server transfers the requests to an application logic module to perform the request; the remote server returns a response to the server-side remote communications software module; the remote server further returns the response, from the server-side remote communication software module, through a network such as the Internet, to the third-party's application; the request to process the document is a command to open the document; the system sends the request using the internet protocol, to an application server, wherein, in operation, the application server is configured to perform the application logic to edit documents; the system receives the universal resource locator (URL) of the document at the third-party's server; the system browser receives the document using the URL; the web browser on the third party system, uses the URL to open the document content in human-readable format; the request to process the document is a command to save the document; the system sends the request using the internet protocol, to an application server, wherein, in operation, the application server is configured to perform the application logic to edit documents; the system sends at least one parameter in the request, a publicly accessible URL of a service, wherein, in operation, the service is configured to fetch the content of the updated document from the application server and save it in a location specified in the third-party's document repository; the service transfers such content to the location specified in the URL parameter; the service notifies the status of completion of the transfer to the application server; the service completes the saving of the data in the third-party's repository; the request is used to transfer content to a third-party's repository without the presence of a firewall; the request originates from one of many collaborating users, editing the same document; the users have identities that the application server uses to differentiate users; the third party application runs on a mobile device; or the application server is installed at the third party site, not accessible on the internet.

Another system constructed in accordance with described techniques can include an application server, configured to perform the application logic for document editing and processing, coupled with a web server, and a server-side remote communications software module. The system can, for example, in operation, accept requests to edit a selected file from a remote user; transfer the requests to the application logic module to perform the request; return the response, from the server-side remote communication software module, through a network such as the Internet, to the user. In this way, the user can communication with the application server to edit the document, save the file data in a file storage repository controlled by the user, distinct from data storage managed by the application server, and close the established session.

The system can include additional functionality such as the user accesses a computer system configured using a third party application coupled to a client-side remote communications software module; the client-side remote communications software communicates the requests and responses to the server-side remote communications module using a common protocol; the request to process the document is a command to open the document; the system receives the universal resource locator (URL) of the document at a third party document server; the system browser receives the document using the URL; the web browser on the third party system, uses the URL to open the document content in human-readable format; the request to process the document is a command to save the document; the client-side communication module sends at least one parameter in the request, a publicly accessible URL of a service, wherein, in operation, the service is configured to fetch the content of the updated document from the application server and save it in a location specified in the third-party's document repository; the service transfers such content to the location specified in the URL parameter; the service notifies the status of completion of the transfer to the application server; the service completes the saving of the data in the third-party's repository.

Another system constructed in accordance with described techniques can include a third-party's application software wherein, in operation, the third-party's software accepts user input from a user interface to edit documents from a document interface; a remote communication software module, coupled with the third-party's software. In operation, for example, the remote communication software module communicates with a server-side communication software module; the remote communication software module and server-side module communicate with a common protocol; a remote application module implements application logic for the function of document editing; software implementing the protocol is a component of the document editing application logic software; the remote application module is coupled to a web server and the server-side communication software module; the remote application module communicates an editable document to a web browser on the third-party's application; a document repository stores file data for the third-party application under control of the user; the user can access and utilize remote applications, not owned or maintained by the user, on document files stored and maintained by the user on a system physically separate from the application server system.

The system can include additional functionality such as the protocol includes an OPEN command; the system receives the universal resource locator (URL) of the document at the third-party's server; the system browser receives the document using the URL; the web browser on the third party system, uses the URL to open the document content in human-readable format; the protocol includes a SAVE command; the client-side communication module sends at least one parameter in the request, a publicly accessible URL of a service, wherein, in operation, the service is configured to fetch the content of the updated document from the application server and save it in a location specified in the third-party's document repository; the service transfers such content to the location specified in the URL parameter; the service notifies the status of completion of the transfer to the application server; the service completes the saving of the data in the third-party's repository; a plurality of users open the same document for editing; each user is assigned a unique ID; each user can see the edit inputs performed by other users; one user requests to save; the client-side communication module transfers the request to the server for processing and temporary save; the last of the plurality of users requests to save the document; the client-side communication module sends at least one parameter in the request, a publicly accessible URL of a service, wherein, in operation, the service is configured to fetch the content of the updated document from the application server and save it in a location specified in the third-party's document repository; the service transfers such content to the location specified in the URL parameter; the service notifies the status of completion of the transfer to the application server; the service completes the saving of the data in the third-party's repository; the server transforms the editable data using parameters provided by the third party application; the server transforms the editable data using parameters provided by the user; the user specifies one or more of logos, designs, colors, fonts, and language; the server transforms the editable data to a different file format for saving, as specified by the user; one or more of the following parameters: time, duration, application type, are maintained for each collaborating user; such parameters are used for billing purposes by the provider of the server-side application server; or the users are provided a temporary identification, and do not have a login identification with the server system.

A method carried out in accordance with described techniques can include using a computer system configured using a third-party's application coupled to a remote communications software module, and a file storage repository; accepting requests from a user to process a document; transferring the requests to the remote communications software module; establishing a session, through the remote communications software module, through the internet, to an application server at a remote location; transferring the requests to the remote application server; accepting the requests at the remote application server, configured with a server-side remote communications software module; transferring the requests to an application logic module to perform the request; returning a response to the server-side remote communications software module; returning the response, from the server-side remote communication software module, through the network, to the third-party's application; communicating with the remote server to edit the document, and saving the file data in the file storage repository controlled by the third party application and closing the session. When carrying out the method, the file storage repository can include a document repository to store file data for the third-party application under control of the user, in a location determined by the third-party application.

Another method carried out in accordance with described techniques can include using a third-party's software application; selecting a document to open; sending the request using the internet protocol, to an application server, the application server, wherein, in operation, is configured to perform the application logic to edit documents; receiving a universal resource locator (URL) of the document at the third-party's server; sending the URL of the document from the third-party's server to the web browser; using the URL to open the document content in human-readable format, on the web browser.

Another method carried out in accordance with described techniques can include using a third-party's software application; selecting a document to save; sending the request using the internet protocol, to an application server, the application server, wherein, in operation, is configured to perform the application logic to edit documents; sending at least one parameter in the request, a publicly accessible universal resource locator (URL) of a service, wherein, in operation, the service is configured to fetch the content of the updated document from the application server and save it in a location specified in the third-party's document repository; transferring such content to the location specified in the URL parameter; notifying the status of completion of the transfer to the application server; completing the saving of the data in the third-party's repository; using the request to transfer content to a third-party's repository without the presence of a firewall.

Another method carried out in accordance with described techniques can include using a third-party's software application; selecting a document to save; sending the request using the internet protocol, to an application server, the application server, wherein, in operation, is configured to perform the application logic to edit documents; sending at least one message to a persistent remote agent, wherein, in operation, the agent, is configured to fetch the content of the updated document from the application server and save it in a location specified in the third-party's document repository, using a secure internet protocol; initiating the transfer of the content from the document server to the third-party's document repository; notifying the status of completion of the transfer to the application server; completing the saving of the data in the third-party's repository. The persistent remote agent may or may not be configured behind a firewall.

Figure 5:
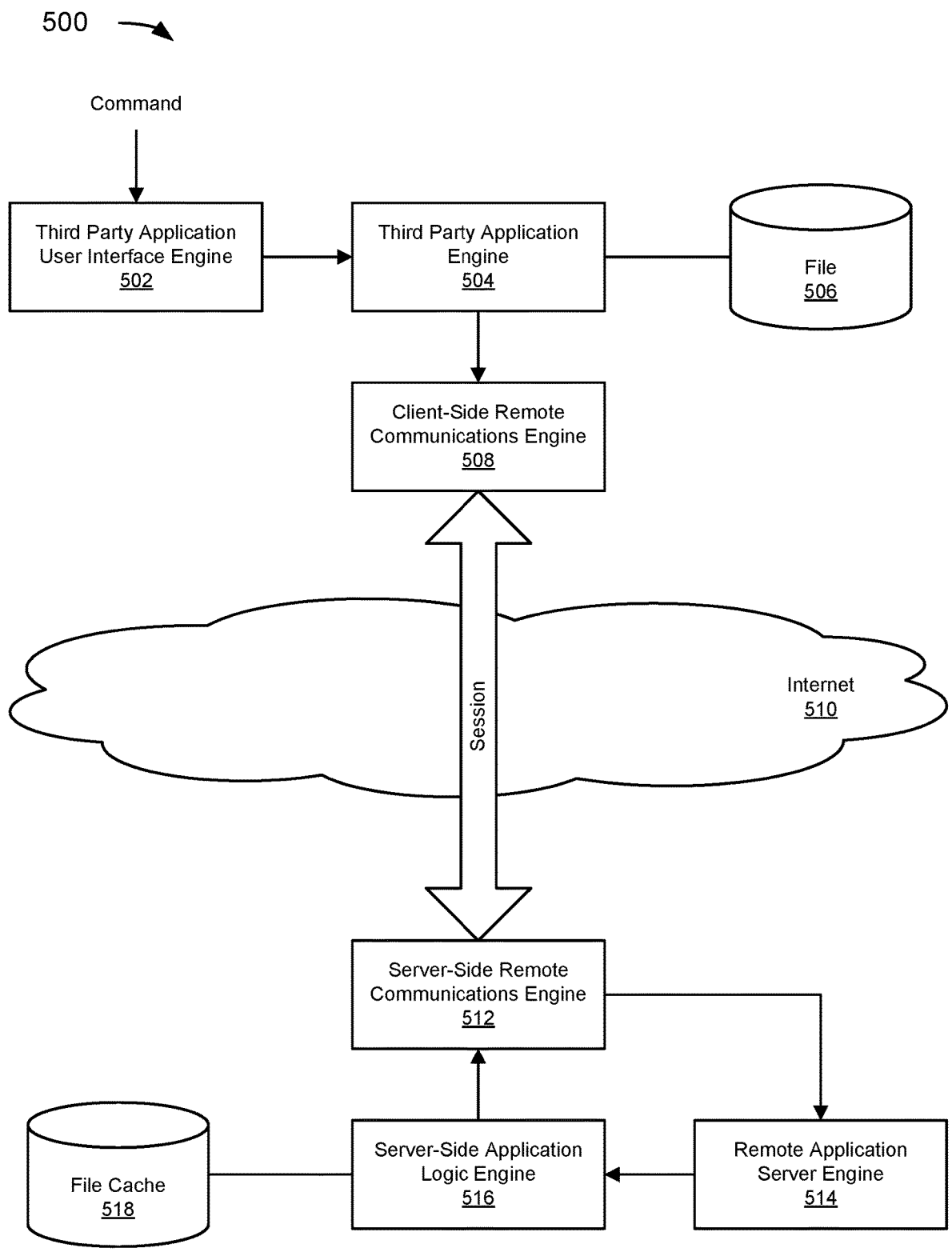
FIG. 5 depicts an example of a system for enabling a user to edit an unhosted third party application using a remote application server.

FIG. 5 depicts an example of a system 500 for enabling a user to edit an unhosted third party application using a remote application server. The system 500 includes a third party application user interface engine 502, a third party application engine 504, a file datastore 506, a client-side remote communications engine 508, the Internet 510, a server-side remote communications engine 512, a remote application server engine 514, a server-side logic engine 516, and a file cache 518. As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 5, the third party application user interface engine 502 can include known or convenient input and output devices. In a specific implementation, the third party application user interface engine 502 enables a user to access a file of an unhosted third party application through a browser or other suitable file interface. For illustrative purposes, the third party application user interface engine 502 is depicted as receiving a command, which, also for illustrative purposes, comes from a user of a device on which the third party application user interface engine 502 is implemented.

In the example of FIG. 5, the third party application engine 504 creates a request from the command, which is provided to the client-side remote communications engine 508. The third party application engine 504 is capable of instantiating the unhosted third party application at a client-side device. The third party application is "unhosted" by server-side devices of the client-side and server-side client-server relationship (and is not necessarily intended to mean the third party application is unhosted with respect to other servers that are not described in this example). The unhosted third party application is "third party" because the application was, in this example, developed, distributed, or sold by an entity that is different from the entity that owns the remote application server engine 514. This functionality can be achieved by incorporating embedded components into the application.

In the example of FIG. 5, the file datastore 506 is coupled to the third party application engine 504. In this example, the file datastore 506 is depicted as being on the same side of the Internet as the client-side components. However, the file datastore 506 could also be remotely located, e.g., accessible through the Internet. The files stored in the file datastore 506 are, for illustrative purposes, of a file type that is appropriate for use with the unhosted third party application.

In the example of FIG. 5, the client-side remote communications engine 508 is the client-side portion of a remote communications engine that is distributed between the server and client devices. The client-side remote communications engine 508 can include an API and any number of other devices that enable communication between any of the client-side components and any of the server-side components. For example, it may or may not be possible for certain information to be passed from server to client though channels other than those illustrated and described in this paper, and the client-side remote communications engine 508 can be characterized as including such communication channels, devices, drivers, and the like to accomplish this. The client-side remote communications engine generates requests for file processing form commands that are received, e.g., at the third party application user interface engine 502.

In the example of FIG. 5, the Internet 510 is the medium through which the client-side remote communications engine 508 and the server-side remote communications engine 512 instantiate a session. Of course, the Internet 510 is just one well-known example of a WAN, and the client-side remote communications engine 508 and the server-side remote communications engine 512 could instantiate a session across some other, presumably smaller, network, as well.

In the example of FIG. 5, the server-side remote communications engine 512 receives the requests from the client-side remote communications engine 508, which the remote application server engine 514 sends to the server-side application logic engine. The server-side application logic engine 516 processes the request using procedures that are appropriate for the document editing interface that is available to a user through the third party application user interface engine 502. For example, if the file is a text document, appropriate processing might include inserting new lines of text at a certain location in the text document. The server-side application logic engine 516 may need the file, which could be temporarily cached in the file cache 518, to enable proper processing of the file. Alternatively, a subset of the file can be sufficient to provide proper processing of requests. In any case, the results of the processing are provided to the server-side remote communications engine 512 to be sent back to the client-side remote communications engine 508.

The third party application engine 504 provides the results received at the client-side remote communications engine 508 to the third party application user interface engine 502 for display to the user. The results can include changes to a document such that the user sees edits that he or she made to the document (and which were sent to the server in a request).

At some point, the third party application engine 504 or the remote application server engine 514 will detect a termination stimulus. A termination stimulus can include, for example, a timeout after a user edits a document for too long, a close file command from the user, or some other stimulus that is sufficient to indicate to the client and/or the server that it is time to close the session. The session can be closed in a manner that is relatively well-known in the relevant art. However, different from the state of the art, is the treatment of the file upon termination. The remote application server engine 514 can, depending upon the implementation, clear the file cache 518. The third party application engine 504, on the other hand, can save the (perhaps edited) file in the file datastore 506.

Figure 6:
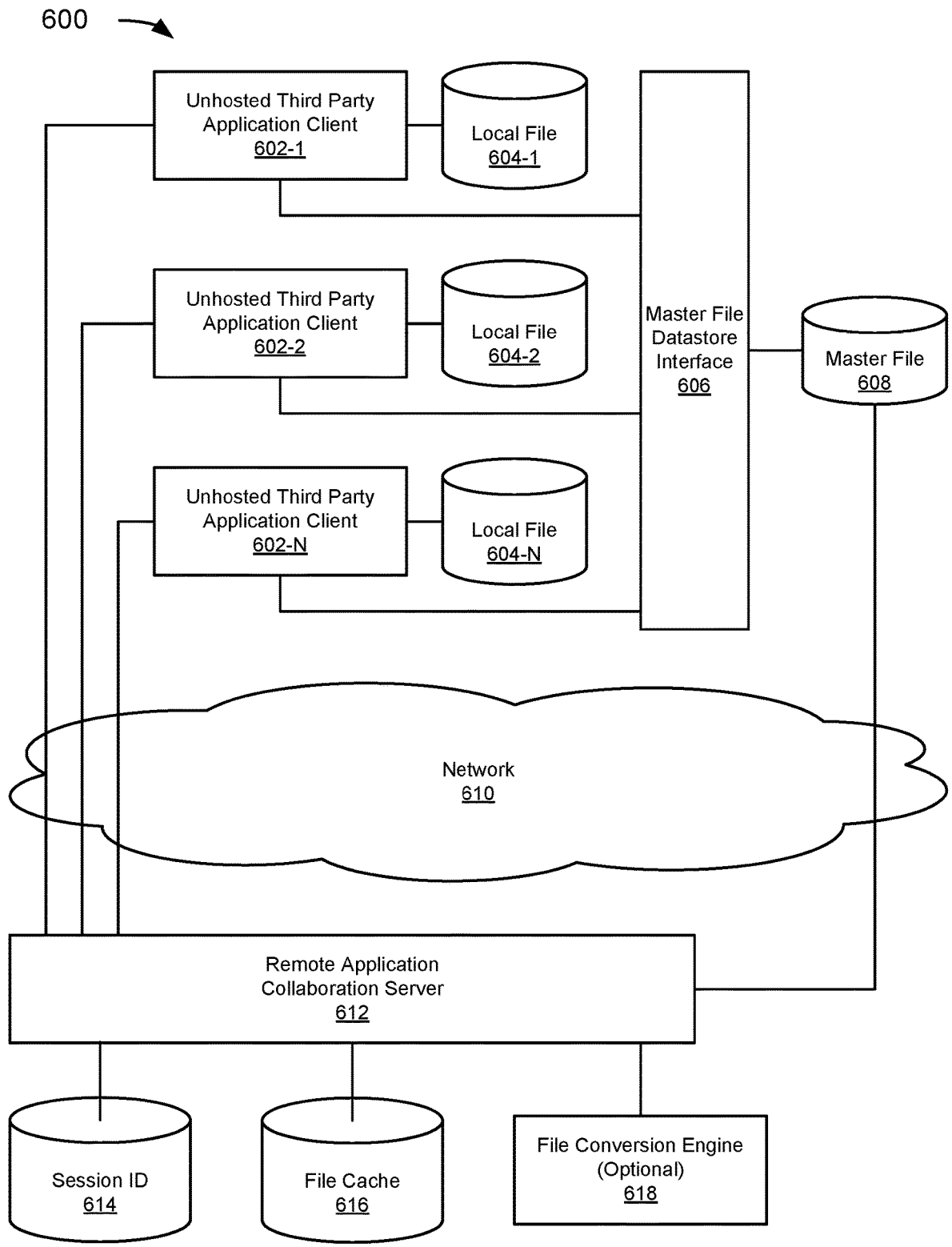
FIG. 6 depicts an example of a system for unhosted third party application collaborative editing.

FIG. 6 depicts an example of a system 600 for unhosted third party application collaborative editing. In the example of FIG. 6, it is assumed that more than one user opens the same document, for the purpose of collaborating. Due to the nature of collaborative editing, the files are likely to be documents with at least some editable text, such as a word processing document or source file. The system 600 can also include file system organizational structure, such as a directory or source tree, which can, depending upon the implementation and/or authorizations, be controlled by users of the system. In the example of FIG. 6, the system 600 includes unhosted third party application clients 602-1 to 602-N (collectively, the unhosted third party application clients 602), local file datastores 604-1 to 604-N (collectively, the local file datastores 604), a master file datastore interface 606, a master file datastore 608, a network 610, a remote application collaboration server 612, a session ID datastore 614, and a file cache 616.

In the example of FIG. 6, the unhosted third party application clients 602 have respective local file datastores 604. The local file datastores 604 can be implemented as a file cache for the document on which users of the unhosted third party application clients 602 are collaborating, or each user could have a complete copy of the master document loaded on their machines. The collaborating client devices can include, for example, third party application user interface engines, third party application engines, file datastores, and client-side remote communications engines, examples of which are described with reference to FIG. 5.

In the example of FIG. 6, the unhosted third party application clients 602 are coupled to a master file datastore interface 606, which gives each client access to the master file datastore 608. The master file datastore interface 606 can include components of each of the unhosted third party application clients 602, but can also be characterized as part of the master file datastore 608 (and located off of all of the unhosted third party application clients 602. The master file datastore interface 606 and the master file datastore 608 can be located on the same device as one of the clients 602, or can be located on a network, e.g., a LAN, to which the unhosted third party application clients 602 have access. Alternatively, the master file datastore 608 can be located on a network not controlled by any of the unhosted third party application clients 602 or the LAN to which the unhosted third party application clients 602 are a part, perhaps accessible over the Internet.

In the example of FIG. 6, the network 610 can include any applicable network, such as a LAN of which the unhosted third party application clients 602 are a part, or some larger network, such as the Internet.

In the example of FIG. 6, the remote application collaboration server 612 communicates over the network 610 with the unhosted third party application clients 602. It may be noted that the unhosted third party application clients are "unhosted" because the third party application used by the application clients is not hosted by the remote application collaboration server. It may also be noted that the unhosted third party application clients are "third party" application clients because the third party application used by the application clients is developed or distributed by a different entity than that which controls the remote application collaboration server 612. The remote application collaboration server 612 can include, for example, a server-side remote communications engine, a remote application server engine, a server-side application logic engine, examples of which are described with reference to FIG. 5.

In the example of FIG. 6, the remote application collaboration server 612 is coupled to the session ID datastore 614 and the file cache datastore 616. In a specific implementation, users of the unhosted third party application clients 602 are assigned respective unique session IDs to facilitate management of communication between the remote application collaboration server 612 and each user. The file cache datastore 616 can be implemented in a manner that is similar to that described with reference to FIG. 5, but can include sufficient information to enable the remote application collaboration server 612 to provide each of the unhosted third party application clients 602 with results of document editing commands. Such results can include inputs from each user so that a collaborator can see the inputs of the other collaborators. Depending upon the implementation and/or configuration, some displays choose to color code each user's edits differently in order to make it easy to see the results of collaborative edits. For illustrative purposes, the data sufficient to identify each user is stored in the session ID datastore 614. A member datastore can be included in the session ID datastore 614, but is not necessarily required.

When a user chooses to save a file on which the user is collaborating, the file is saved at the master file datastore 608, which is generally accessible to all of the collaborators. A file stored in the master file datastore 608 may have an associated universal resource locator (URL) by which the location of the master file can be found. After each collaborator on the file has closed their session with the remote application collaboration server 612, the remote application collaboration server 612 can clear the file cache 616. In this way, the master file datastore 608 stores the master file, and not the remote application collaboration server 612.

Another aspect of flexibility that can be implemented in the system 600 is that a user could choose to save a document in a different format than the format in which the document is edited. For example, the file conversion engine 618 can convert a plain text document to PDF. In a specific implementation, the conversion is done at the server side, which integrates the capacity to perform any applicable format conversion (generally, the more choices, the better). The file conversion engine 618 can be implemented in a system that may or may not offer collaboration.

Another embodiment differs in the handling of saving in the case of collaborative editing, where individual user requests to save are handled as "marked for saving", which is handled by the remote application collaboration server 612 (and in particular, an application logic engine). At the end the final "save," the remote application collaboration server and/or the last collaborator of the unhosted third party application clients 602 transfers relevant data to the master file datastore 608.

The remote application collaboration server 612 may or may not clear the session ID datastore 614 upon closing a last session with the unhosted third party application clients 602. In a specific implementation, the remote application collaboration server 612 could maintain usage statistics for each collaborating user. For example, the remote application collaboration server 612 could maintain usage times, durations, and other statistics that could be used for billing individual users for usage.

What is claimed is:

1. A system for enabling a user to communicate with an application server to edit a file and save file data in a storage repository controlled by the user, distinct from data storage managed by the application server, comprising:
   a server-side remote communications engine for establishing a session with a client-side remote communications engine;
   a remote application server engine, coupled to the server-side remote communications engine;
   a server-side application logic engine, coupled to the remote application server engine, configured to perform application logic for processing a file opened in an application, the file having a first file format;
   wherein in operation,
   the server-side remote communications engine receives from the client-side remote communications engine a request to process the file, file data for the file, and one or more parameters for processing the file, the one or more parameters including one or more of logos, designs, colors, fonts and language;

the remote application server engine transfers the file data and the request to the server-side application logic engine;

the server-side application logic engine processes the file data in accordance with the request and transfers a result of the processing to the server-side remote communications engine;

the server-side remote communications engine sends the result to the client-side remote communications engine;

the server-side remote communications engine receives a request from the client-side remote communications engine to convert the file into a file having a second file format;

the server-side remote communications engine converts the file into the file having the second file format in accordance with the request, and sends the file having the second file format to the client-side remote communications engine;

the client-side remote communications engine saves the file having the second file format in the storage repository controlled by the user;

the server-side remote communications engine closes the session in response to detecting a termination stimulus;

the server-side remote communications engine deletes the file data for the file.

2. The system of claim 1, wherein the server-side remote communications engine receives the request from and sends the response to the client-side remote communications engine using a common protocol.

3. The system of claim 1, wherein the request to process the file includes a command to open, view, edit, or save the file.

4. The system of claim 1, wherein the request includes data sufficient for the server-side remote communications engine to identify a universal resource locator (URL) of the file.

5. The system of claim 4, wherein a browser receives the file using the URL.

6. The system of claim 4, wherein a browser uses the URL to open content of the file in human-readable format.

7. The system of claim 4, wherein the request includes a save command, wherein, in operation, the server-side remote communications engine receives a publicly accessible universal resource locator (URL) of a service, enabling the service to fetch content of the file from the remote application server engine and to save the content in a third-party's document repository.

8. The system of claim 7, wherein the remote application server engine receives a status of completion of transfer from the service.

9. A method comprising:

receiving, from a third-party-controlled remote server that is client-side relative to a server-side application server that hosts a document editing application, a request to process a modification to a file maintained in a file storage repository in a client-side network and one or more parameters influencing presentation of the file, the file storage repository being distinct from data storage managed by the server-side application server, the file having a first file format, the one or more parameters including one or more of logos, designs, colors, fonts and language;

in response to the request, executing, at the server-side application server, the document editing application to process modification of the file based on the request and the one or more parameters;

sending a response to the request from the server-side application server to the third-party-controlled remote server, the response including file data for presenting the file by a third party application hosted by the third-party-controlled remote server and enabling display of at least a portion of the file using the file data at a user interface generated at a client device;

receiving from the third-party-controlled remote server a request to convert the file into a file having a second file format;

converting, at the server-side application server, the file into the file having the second file format in accordance with the request;

sending, by the server-side application server to the third-party-controlled remote server, the file having the second file format;

saving, by the third-party-controlled remote server, the file having the second file format in the file storage repository in the client-side network;

deleting, by the server-side application server, the file data.

10. The method of claim 9, wherein the request is received from a client-side remote application programming interface (API) embedded in the third party application by a server-side remote API on the server-side application server, and the response is transferred from the server-side remote API to the client-side remote API.

11. The method of claim 9, wherein the request and the one or more parameters are received as a message in accordance with an internet protocol.

12. The method of claim 9, wherein the file data includes a universal resource locator (URL), which enables the third party application to retrieve the at least a portion of the file from the file storage repository using the URL.

13. The method of claim 9, wherein the request includes a request to open, view, edit, or save the file.

14. The method of claim 9, further comprising:
receiving, from the third-party-controlled remote server, a request to save data associated with the file;
in response to the request to save the data associated with the file, pushing, by the server-side application server, the data associated with the file to a location identified by a universal resource locator (URL) and sending the URL from the server-side application server to the third-party-controlled remote server.

15. The method of claim 9, further comprising:
receiving, from the third-party-controlled remote server, a request to save data associated with the file;
in response to the request to save the data associated with the file, pushing, by the server-side application server, the data associated with the file to a location identified by a universal resource locator (URL) and sending the URL from the server-side application server to the third-party-controlled remote server;
after sending the URL, receiving, from the third-party-controlled remote server, a notification of completion of saving the data associated with the file.

16. The method of claim 9, further comprising:
detecting, by the document editing application, a termination stimulus;
in response to the termination stimulus, causing, by the server-side application server, the data associated with the file to be saved in the file storage repository.

17. The method of claim 9, wherein the client device is associated with a user who is one of a plurality of collaborating users editing the file, each user having an identification sufficient to enable the client-side network to differentiate between the plurality of collaborating users.

18. The method of claim 9, further comprising establishing a session with the third-party-controlled remote server over the network, wherein the request and the one or more parameters are received and the response is sent during the session.

19. The method of claim 9, further comprising:
   establishing a session the with third-party-controlled remote server over the network, wherein the request and the one or more parameters are received and the response is sent during the session;
   detecting, by the document editing application, a termination stimulus;
   in response to the termination stimulus, causing, by the server-side application server, the data associated with the file to be saved in the file storage repository.

20. A system comprising:
   a means for receiving, from a third-party-controlled remote server that is client-side relative to a server-side application server that hosts a document editing application, a request to process a modification to a file maintained in a file storage repository in a client-side network and one or more parameters influencing presentation of the file, the file storage repository being distinct from data storage managed by the server-side application server, the file having a first file format, the one or more parameters including one or more of logos, designs, colors, fonts and language;
   a means for executing, at the server-side application server in response to the request, the document editing application to process modification of the file based on the request and the one or more parameters;
   a means for sending a response to the request from the server-side application server to the third-party-controlled remote server, the response including file data for presenting the file by a third party application hosted by the third-party-controlled remote server and enabling display of at least a portion of the file using the file data at a user interface generated at a client device;
   a means for receiving from the third-party-controlled remote server a request to convert the file into a file having a second file format;
   a means for converting, at the server-side application server, the file into the file having the second file format in accordance with the request;
   a means for sending, by the server-side application server to the third-party-controlled remote server, the file having the second file format;
   a means for saving, by the third-party-controlled remote server, the file having the second file format in the file storage repository in the client-side network;
   a means for deleting, by the server-side application server, the file data.

* * * * *